US010469994B2

(12) United States Patent
Hawkins et al.

(10) Patent No.: US 10,469,994 B2
(45) Date of Patent: *Nov. 5, 2019

(54) LABELING LOCATIONS BASED ON CONTACT INFORMATION

(71) Applicant: GOOGLE LLC, Mountain View, CA (US)

(72) Inventors: Dale Hawkins, Erie, CO (US); Thomas Carl Stamm, Louisville, CO (US); Andrew Kirmse, Redwood City, CA (US); Tushar Udeshi, Broomfield, CO (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/990,657

(22) Filed: May 27, 2018

(65) Prior Publication Data

US 2018/0279088 A1    Sep. 27, 2018

Related U.S. Application Data

(63) Continuation of application No. 15/400,477, filed on Jan. 6, 2017, now Pat. No. 9,986,386, which is a
(Continued)

(51) Int. Cl.
*H04W 4/029* (2018.01)
*H04W 4/02* (2018.01)
(Continued)

(52) U.S. Cl.
CPC ........ *H04W 4/029* (2018.02); *G06F 16/9535* (2019.01); *G06F 16/9537* (2019.01);
(Continued)

(58) Field of Classification Search
CPC ... H04L 47/125; H04L 41/0896; H04L 47/78; H04L 65/607; H04L 65/601; H04L 47/10;
(Continued)

(56) References Cited

U.S. PATENT DOCUMENTS 6,091,956 A * 7/2000 Hollenberg ............ G06Q 30/02
                                                      455/456.5
6,360,102 B1 * 3/2002 Havinis ................. H04L 63/102
                                                      455/457
(Continued)

FOREIGN PATENT DOCUMENTS

CN      101004444 A     7/2007
CN      101038177 A     9/2007
(Continued)

OTHER PUBLICATIONS

Extended European Search Report for Application No. 19171277.7, dated May 23, 2019.
(Continued)

*Primary Examiner* — Sharad Rampuria
(74) *Attorney, Agent, or Firm* — Marshall, Gerstein & Borun LLP

(57) ABSTRACT

The systems and techniques disclosed herein provide the ability to present, via a user interface, an indication of a geographic location to a user, determining that the geographic location corresponds to an address included in contact information for one of several contacts of the user, the contact information further including a name; receive, via the user interface, an indication that the geographic location is to be associated with the name included in the contact information; generate a location label for the geographic location, using the name included in the contact information; and outputting an indication of the location label.

18 Claims, 7 Drawing Sheets

Related U.S. Application Data continuation of application No. 15/146,382, filed on May 4, 2016, now Pat. No. 9,571,984, which is a continuation of application No. 14/281,406, filed on May 19, 2014, now Pat. No. 9,344,852, which is a continuation of application No. 14/109,614, filed on Dec. 17, 2013, now Pat. No. 8,761,812, which is a continuation of application No. 13/946,591, filed on Jul. 19, 2013, now Pat. No. 8,630,663, which is a continuation of application No. PCT/US2013/047184, filed on Jun. 21, 2013.

(60) Provisional application No. 61/663,810, filed on Jun. 25, 2012, provisional application No. 61/662,969, filed on Jun. 22, 2012.

(51) Int. Cl.
| | | |
|---|---|---|
| *G06F 16/9535* | (2019.01) | |
| *G06F 16/9537* | (2019.01) | |
| *H04W 64/00* | (2009.01) | |
| *H04L 12/58* | (2006.01) | |
| *H04M 1/725* | (2006.01) | |
| *H04W 8/18* | (2009.01) | |

(52) U.S. Cl.
CPC ........ *H04L 51/20* (2013.01); *H04M 1/72572* (2013.01); *H04W 4/023* (2013.01); *H04W 8/18* (2013.01); *H04W 64/00* (2013.01)

(58) Field of Classification Search
CPC ............ H04N 19/164; H04N 21/2402; H04W 28/0273; H04W 28/0268; H04W 28/0263; H04W 28/0257; H04W 28/0252; H04W 28/0247; H04W 28/021; H04W 28/0205; H04W 28/02

See application file for complete search history.

(56) References Cited

U.S. PATENT DOCUMENTS

| | | | |
|---|---|---|---|
| 6,362,778 B2 | 3/2002 | Neher | |
| 6,879,846 B1 | 4/2005 | Miyata | |
| 7,085,578 B2* | 8/2006 | Barclay | H04W 4/02 455/404.2 |
| 7,620,404 B2 | 11/2009 | Chesnais et al. | |
| 7,801,542 B1 | 9/2010 | Stewart | |
| 8,050,690 B2 | 11/2011 | Neeraj | |
| 8,099,129 B2 | 1/2012 | Haitani et al. | |
| 8,265,871 B1 | 9/2012 | Starns et al. | |
| 8,538,442 B1* | 9/2013 | Ettinger | H04W 40/244 455/446 |
| 8,630,663 B1 | 1/2014 | Hawkins et al. | |
| 8,639,272 B2 | 1/2014 | Tysowski | |
| 8,761,812 B2 | 6/2014 | Hawkins et al. | |
| 9,076,009 B2 | 7/2015 | Sathish | |
| 9,344,852 B2 | 5/2016 | Hawkins et al. | |
| 9,571,984 B2 | 2/2017 | Hawkins et al. | |
| 9,843,895 B2 | 12/2017 | Huang | |
| 9,986,386 B2 | 5/2018 | Hawkins et al. | |
| 2003/0060212 A1 | 3/2003 | Thomas | |
| 2004/0257273 A1 | 12/2004 | Benco et al. | |
| 2005/0181774 A1 | 8/2005 | Miyata | |
| 2007/0264968 A1 | 11/2007 | Frank et al. | |
| 2008/0055154 A1 | 3/2008 | Martucci et al. | |
| 2008/0070593 A1 | 3/2008 | Altman et al. | |
| 2008/0076451 A1 | 3/2008 | Sheha et al. | |
| 2009/0047972 A1 | 2/2009 | Neeraj | |
| 2010/0004997 A1 | 1/2010 | Mehta et al. | |
| 2010/0205242 A1 | 8/2010 | Marchioro, II | |
| 2010/0248744 A1 | 9/2010 | Bychkov et al. | |
| 2011/0029420 A1 | 2/2011 | Bianco et al. | |
| 2011/0081921 A1 | 4/2011 | Casey | |
| 2011/0194682 A1 | 8/2011 | Hans et al. | |
| 2011/0196925 A1 | 8/2011 | Hans et al. | |
| 2011/0244840 A1 | 10/2011 | Tang | |
| 2012/0124079 A1 | 5/2012 | Kinsella | |
| 2012/0135751 A1 | 5/2012 | Mishra | |
| 2012/0191777 A1 | 7/2012 | Iwasaki et al. | |
| 2013/0225196 A1 | 8/2013 | James | |
| 2013/0237242 A1 | 9/2013 | Oka | |
| 2014/0256358 A1 | 9/2014 | Hawkins et al. | |
| 2014/0289850 A1 | 9/2014 | Yu et al. | |
| 2016/0249179 A1 | 8/2016 | Hawkins et al. | |

FOREIGN PATENT DOCUMENTS

| | | |
|---|---|---|
| CN | 101796784 A | 8/2010 |
| CN | 102047249 A | 5/2011 |
| CN | 102047697 A | 5/2011 |
| CN | 102131144 A | 7/2011 |
| CN | 102214199 A | 10/2011 |
| EP | 2 453 367 A1 | 5/2012 |
| WO | WO-2009/032663 A1 | 3/2009 |
| WO | WO-2009/151925 A2 | 12/2009 |

OTHER PUBLICATIONS

First Office Action, and translation thereof, from counterpart Chinese Patent Application No. 201380033076.8, dated Apr. 20, 2016, 10 pp.

International Preliminary Report on Patentability from International Application No. PCT/US2013/047184, dated Apr. 23, 2015, 7 pages.

International Search Report and Written Opinion of counterpart International Application No. PCT/US2013/047184, dated Apr. 6, 2015, 10 pages.

Notice of Preliminary Rejection and English Translation from counterpart Korean Application No. 100-2014-7035644, dated May 6, 2015, 4 pages.

Prosecution History from U.S. Appl. No. 13/946,591, dated Sep. 9, 2013, 12 pages.

Prosecution History from U.S. Appl. No. 14/109,614, dated Dec. 19, 2013 through Feb. 12, 2014, 16 pages.

Prosecution History from U.S. Appl. No. 14/281,406, dated Jun. 11, 2014 through Mar. 22, 2016, 28 pages.

Prosecution History from U.S. Appl. No. 14/281,406, dated May 12, 2016 through Oct. 5, 2016, 21 pages.

Response to Examination Report dated Aug. 13, 2015, from counterpart European Application No. 13734604.5, filed Feb. 19, 2016, 120 pages.

Search Report from counterpart European Application No. 13734604.5, dated Jul. 27, 2015, 5 pages.

The Notification of Preliminary Rejection, and translation thereof, from counterpart Korean Application No. 10-2016-7009728, dated May 9, 2016, 4 pages.

Notification of First Office Action for Chinese Application No. 201611060347.0, dated Jul. 29, 2019.

Notification of First Office Action for Chinese Application No. 201611060344.7, dated Aug. 1, 2019.

Notification of First Office Action for Chinese Application No. 201611061541.0, dated Aug. 27, 2019.

\* cited by examiner

| First Name | Last Name | Email | Telephone | Home Address | Home City | Home State | Home Zip |
|---|---|---|---|---|---|---|---|
| John | Doe | jdoe@gmail.com | (999)-999-9999 | 10 Pine Street | Boston | MA | 02210 |
| Jane | Doe | jane.doe@gmail.com | (999)-999-9998 | 99 Main Street | Boston | MA | 02210 |

FIG. 5

LABELING LOCATIONS BASED ON CONTACT INFORMATION

This application is a Continuation of application Ser. No. 15/146,382, filed May 4, 2016, which is a Continuation of application Ser. No. 14/281,406, filed May 19, 2014, which is a Continuation of application Ser. No. 14/109,614, filed Dec. 17, 2013, which is a Continuation of application Ser. No. 13/946,591, filed Jul. 19, 2013, which is a Continuation of Application Ser. No. PCT/US13/047184, filed Jun. 21, 2013, which claims the benefit of U.S. Provisional Application Ser. No. 61/662,969, filed Jun. 22, 2012, and U.S. Provisional Application Ser. No. 61/663,810, filed Jun. 25, 2012. The entire content of each of these applications is incorporated by reference herein.

BACKGROUND

Mobile devices such as smart phones and tablets have opened up a variety of new services that can be provided to users. An extremely popular and growing category of these new services involve location tracking and awareness. The geographic location of a mobile device can be determined using any of several technologies for determining position, including by referencing cellular network towers, Wi-Fi access point locations, or by using data from Global Positioning System (GPS) components. Example applications utilizing location tracking and awareness include everything from location reporting to social interactions based on position.

One common problem faced by many of these new services is the relation of a geographic position (e.g., a latitude and longitude on the globe) with a relevant location label (e.g., home, work, etc.). Prior art techniques and systems for solving this problem are limited to searching businesses or other publicly listed locations. Having incomplete data to create relevant and meaningful labels for geographic positions can degrade the quality of information presented to a user, thereby degrading their experience with location-tracking or location-aware services.

SUMMARY

In one example, the disclosure describes a method including collecting, by a computing device, location history data associated with a user, and determining, by the computing device and based on the location history data, a location visited by the user. Additionally, the method can include associating, by the computing device, the location visited by the user with a contact location label, the contact location label determined based at least in part on contact information associated with the user and the location, and outputting, by the computing device, an indication of the contact location label.

In another example, the disclosure describes a system including one or more processors configured to collect location history data associated with a user, and calculate a geographic center for a cluster of location history data points from the location history data and an accuracy radius for the geographic center, the geographic center and the accuracy radius together defining a location visited by the user. The one or more processors also can be configured to associate the location visited by the user with a contact location label, the contact location label determined based at least in part on contact information associated with the user and the location, and output an indication of the contact location label.

In a further example, the disclosure describes a method including collecting, by a computing device, location history data associated with a user, determining, by the computing device, based at least in part on the location history data, a location visited by the user, determining, by the computing device, that the location visited by the user is associated with a location label, and updating, by the computing device, a contact list associated with the user to include a contact list entry including the location label and an indication of the location.

In an additional example, the disclosure describes a system including one or more processors configured to collect location history data associated with a user, and determine, based at least in part on the location history data, a location visited by the user. The one or more processors also can be configured to determine that the location visited by the user is associated with a location label derived from a second user, and update a contact list associated with the user to include a contact list entry associated with the second user including the location label and an indication of the location.

BRIEF DESCRIPTION OF DRAWINGS

The aspects and examples of the techniques of the disclosure described above will be more fully understood from the following detailed description taken in conjunction with the accompanying drawings, in which:

FIG. 5 is a table illustrating example contact list entry information utilized in aspects of the disclosure;

DETAILED DESCRIPTION

Figure 1:
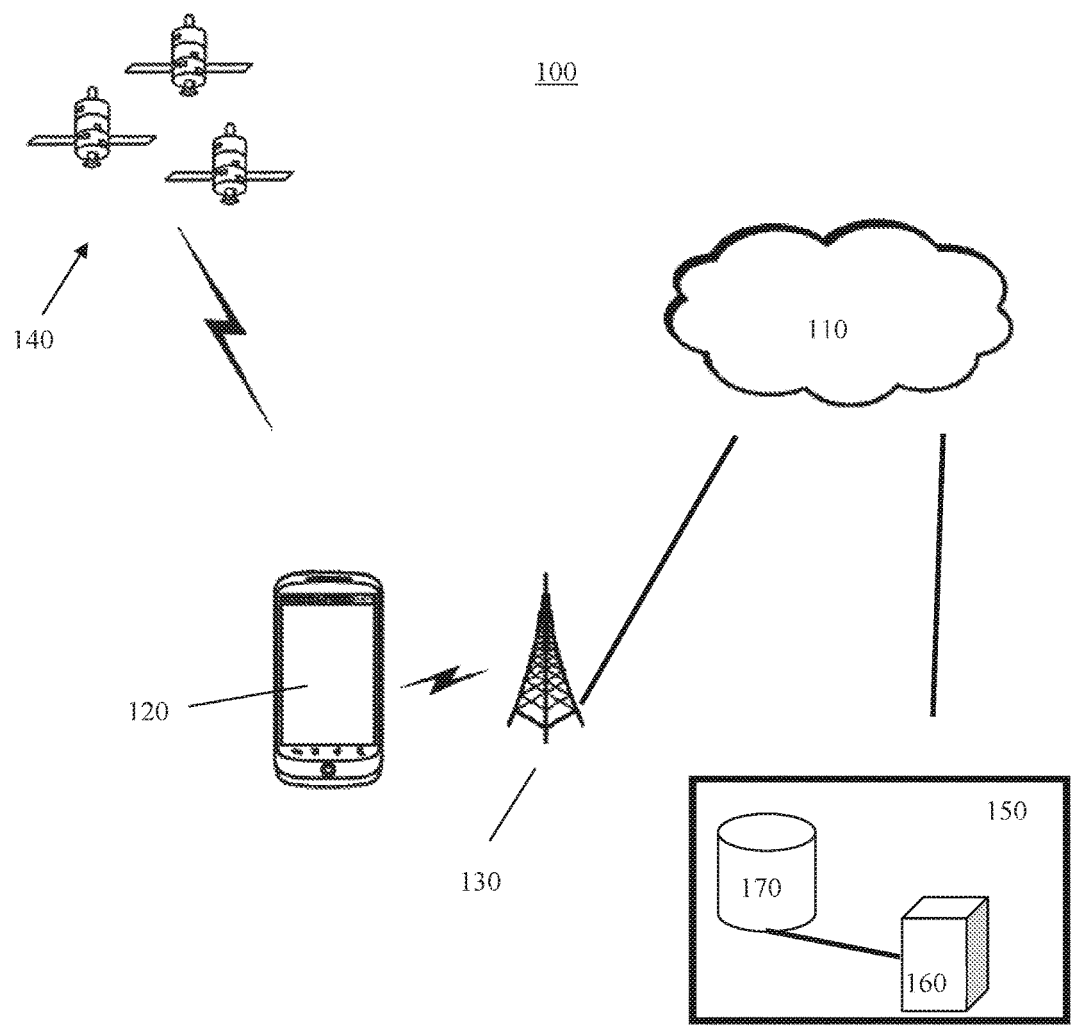
FIG. 1 schematically illustrates an example mobile network according to aspects of the disclosure.

The systems and techniques disclosed herein provide the ability to determine locations visited by a user and associate relevant location labels with the locations visited based on contact information. The use of contact information associated with a user (e.g., addresses stored in a user's contact list for each contact) allows systems and techniques according to the disclosure to provide relevant labels for locations visited when the locations visited are not available through local search queries or other public information sources. In some examples, a location label can be applied based on a match between a location visited and information stored in a user's contact list. In other examples, a user can efficiently designate a contact and location label to be associated with a location visited. In still other examples, if a location visited by a user is not listed in the user's contact list, but is otherwise known, the location visited can be appropriately labeled and the corresponding contact in the user's contact list can be updated to include the location visited.

Certain examples will now be described to provide an overall understanding of the principles of the structure, function, manufacture, and use of the systems and techniques disclosed herein. Examples are illustrated in the accompanying drawings. Those skilled in the art will understand that the systems and techniques specifically described herein and illustrated in the accompanying drawings are non-limiting examples and that the scope of the present disclosure is defined solely by the claims. The features illustrated or described in connection with one example may be combined with the features of other examples. Such modifications and variations are intended to be included within the scope of the present disclosure.

A user's location can be inferred based on the location of the user's mobile device. Location information can be stored at various time intervals to provide a location history of the device and the user. This location history can be stored in a cache or other memory on the mobile device, or it can be transmitted to a server over a mobile network and stored in a datastore. The user may be provided with an opportunity to control whether programs or features, e.g., executed by a computing device associated with or used by the user, collect user information (e.g., information about the user's location, or other information, such as about the user's contacts, social network connections, social actions or activities, preferences, or the like), and/or to control whether and/or how to receive content from a content server based on the collected information. In addition, certain data may be treated in one or more ways before it is stored or used, so that no personally identifiable information can be determined for the user, or a user's geographic location may be generalized where location information is obtained (such as to a city, ZIP code, or state level), so that a particular location of a user cannot be determined. In these ways, the user may have control over how information is collected and used by a content server.

FIG. 1 illustrates an example of a mobile network 100 for providing location-based services. In the illustrated example, the mobile network 100 includes a communications network 110 and a mobile device 120. The mobile device 120 can connect to the communications network 110 via various access points 130. Although one mobile device 120 and one access point 130 is illustrated for example purposes, the mobile network can include any number of mobile devices and access points.

The mobile device 120 can be any device that is configured to exchange data over a mobile network. For example, the mobile network 100 can be a GSM, TDMA, or CDMA technology enabled network, or any other form of wireless network, e.g., IEEE 802.11, Bluetooth, or other Wi-Fi network, or a combination of wired and wireless networks. The access points 130 can be a form of radio receiver or transmitter that provides a gateway between the mobile device 120 and the communications network 110. For example, the access points can be wireless routers or cellular network towers. In some examples, the mobile device 120 can also receive GPS signals transmitted from GPS satellites 140.

In the illustrated example, the mobile network 100 also includes a location server 150 that can exchange data with the mobile device 120 via the communications network 110. The location server 150 can include, for example, a digital data processor 160 in communications coupling with a digital datastore 170 such as a database or other memory or storage unit capable of storing digital data.

The location server 150 can be implemented on one or more computing devices programmed with software, firmware or hardware instructions. Such computing devices may include, but are not limited to, one or more personal computers, workstations, mini-computers, clustered computer systems, and/or embedded systems. Some or all of the location server 150 functionality could also be implemented on the mobile device 120 itself. Such computing devices (including the mobile device 120) may also include, but are not limited to, a device having one or more processors and memory for executing and storing instructions. Such a computing device may include software, firmware, and hardware. Software may include one or more applications and an operating system. Hardware can include, but is not limited to, a processor, memory and graphical user interface display. The location server 150 may be implemented using hardware, software or a combination thereof and may be implemented in a computer system or other processing system.

Figure 2:
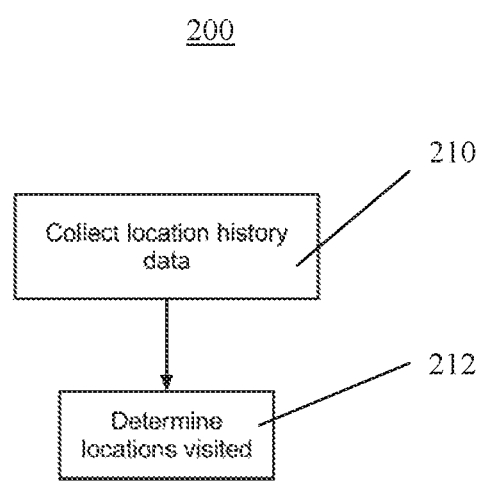
FIG. 2 is a flowchart of an example technique for collecting and analyzing location history data for a user.

An example technique 200 for collecting location information and determining locations visited by a user is illustrated in FIG. 2. The technique 200 may include obtaining location history data, or it might include operating on pre-existing location history data. As shown in FIG. 2, the technique 200 begins at step 210 where location history data is collected. For example, the location history data can be generated by a mobile device, such as the mobile device 120 of FIG. 1, and communicated to the location server 150 over the mobile network 100 via access points 130 and communications network 110. Location history data can also be collected by location server 150, such as when a user "checks in" at a location using any number of social applications that provide for such check-ins.

The user may be provided, e.g., by mobile device 120, with an opportunity to control whether programs or features, e.g., executed by mobile device 120, collect user information (e.g., location history information, or other information, such as about the user's contacts, social network connections, social actions or activities, preferences, or the like), and/or to control whether and/or how to receive content from a content server (e.g., location server 150) based on the collected information. In addition, certain data may be treated in one or more ways before it is stored or used, so that no personally identifiable information can be determined for the user, or a user's geographic location may be generalized where location history information is obtained (such as to a city, ZIP code, or state level), so that a particular location of a user cannot be determined. In these ways, the user may have control over how information is collected and used by a content server.

The location history data can be acquired by the mobile device using any of several technologies for determining position. For example, the location data can be acquired by the mobile device using a GPS receiver. The Global Positioning System (GPS) is a space-based satellite navigation system that provides location and time information anywhere on or near the Earth where there is an unobstructed line of sight to four or more GPS satellites. The system is freely accessible by anyone with a GPS receiver, and many smart phones and other mobile devices include GPS receivers. The location data can also be determined using other techniques, such as proximity to cell towers (or other mobile network access points) of known location, or triangulating between the mobile device and a plurality of such towers.

In some examples, location history data can be acquired by the mobile device and stored locally in a memory on the device. The location history data can, in some examples, be processed on the mobile device using a processor on the device. In other examples, the location history data can be communicated to the location server for processing. For example, location history data can be acquired and transmitted directly to the location server. In some examples, location history data can be stored on the mobile device and transmitted to the location server at predetermined intervals. For example, location history data acquired during a time period, e.g., a day, week, month, etc., can be stored on the mobile device, and transmitted to the location server at the end of that time period. In some examples, the location history data can be acquired and stored on the mobile device until certain conditions are met, e.g., access to a wireless network, and then communicated to the location server. In some examples, the location history data can be stored on the location server, e.g., in digital datastore 170 of FIG. 1, until data covering a plurality of days has been received. The location history data can include both historical location data as well as current location data.

Location history data can be acquired by the mobile device at various intervals. In some examples, location history data can be acquired by the mobile device at regular intervals during each day. For example, location history data can be acquired several times per minute, once per minute, once per hour, once every two hours, or at any other time interval. For building a location history that is more useful with the techniques described herein, more frequent location sampling can be better than employing long intervals between location data acquisitions.

Figure 3:
FIG. 3 is a table illustrating example location history data utilized in aspects of the disclosure.

Location history data can be expressed in a variety of manners. As shown in FIG. 3, location history data can take the form of information representing a geographic position and point in time, e.g., a latitude 310, longitude 312, date 314, and time 316. Location history data can also include an accuracy radius 318 that represents an estimate of the accuracy of that location data point. The accuracy radius can range from meters to kilometers, depending on the type of location data. For example, GPS location data can have an accuracy radius of several meters while cellular network tower location data can have an accuracy radius of several kilometers.

The location history data can be processed to reduce the plurality of data points to a listing of locations visited by a user, as shown by step 212 in FIG. 2. In some examples, the location history data can be processed by the location server 150. The location server 150 can process and analyze the location history data in a number of ways. For example, raw geographic location history data (such as that shown in FIG. 3) can be processed to generate "visited place" geographic data. For example, location history data can be processed to relate the raw location history data to a visited location by calculating a centroid for a cluster of nearby location history data points. A cluster of location history data points can be defined as a set of location history data points that are physically close to one another and a centroid can be defined as the geographic center of a cluster of such data points. This can be referred to as distance-based clustering. In addition, dates and times can be used to further filter the location history data and produce clusters of data points that are proximate in both space and time. For example, for a plurality of data points gathered during a period when a user is expected to be at home, e.g., during the night, there may be data points that correspond to different locations within the user's house, e.g., the kitchen, bedroom, living room, etc. The location history data for this period may show small variations in latitude and longitude, but would relate to a single place—the home. Accordingly, such points that are close in geography over time can be treated as a cluster that represents a single place. Clustering by determining a centroid among slightly varying positions can provide a single geographic position to represent the location visited, and can be associated with a time span spent there (e.g., the time spanned from the first to the last location history data point in the cluster). In addition, clustering can aid in reducing variability in the location history data caused by inaccuracies in the location data collection (e.g., errors in position acquisition from GPS or other sources).

In addition to determining a centroid as a single geographic position representing a location visited, other processing might include reverse geocode lookups to obtain information about the location, such as an address or a business name. For example, processes known as geocoding and reverse geocoding can be used to convert location data from geographic coordinates to human-readable addresses. Geocoding refers to a process in which a human-readable address, e.g., 1600 Amphitheatre Parkway, Mountain View, Calif., can be converted to location data in geographic coordinates, e.g., latitude 37.423021 and longitude −122.083739. Reverse geocoding refers to the reverse process, i.e., converting geographic coordinates into an address. Such information can be stored with the location history data. Alternatively, these processes can be used to reverse geocode the raw location history data points and thereby form clusters—for example, by clustering location history data points that relate to a single address. This can be referred to as address-based clustering.

The data represented by the clustering processes discussed above can take the form of a longitude, latitude, start time, and end time, where the longitude and the latitude are for the centroid and the start and end times represent the time span over which the user was present in a particular place. The clustered location history data may also include a radius that can reflect inaccuracies in the location measurement, movement of the person within the cluster, or both. In addition, the data can reflect multiple visits to the same place within a user's location history data. In such an example, the data can include a vector of visit times, with each visit time including a start time and end time pair.

Technique step 212 of determining locations visited by a user can also include conducting a local search using a geographic location from a user's location history data, such as a centroid calculated from the raw location history data points. In some examples, a geographic location can include at least a position and a time. In some examples, the geographic location can also include a radius, or distance from the position. This radius can be derived from accuracy information relating to the technique of acquiring the geographic location, or it could be based upon variation in position within a cluster. Alternatively, a preselected value for the radius can be used. The purpose of conducting a local search is to return destinations that are proximate to the geographic location. In general, destinations are businesses, addresses, or other mappable features that can represent places that might have been visited by the user.

The local search can be conducted on a local search engine. Local search engines are search engines that attempt to return business listings and/or relevant web pages within a specific geographical area. For a local search, a user may enter a search query and specify a geographical area near which the search query is to be performed. The local search engine can return to the user relevant results, such as listings of businesses in the geographical area and/or relevant web pages pertaining to the geographical area.

In some examples, the local search can be conducted by making a call to a local search engine with the geographic location from the user's location history data and a radius in which the search is to be performed. For example, the local search might be conducted for a latitude and longitude, along with a radius, such as, for example, 200 meters. The latitude and longitude are generally a point or the centroid of a cluster from the user's location history data. The radius may be calculated as described above, or it might be preselected, such as 200 meters. The 200 meter radius can be helpful if the expected accuracy in the location history data is on the order of 100 meters. In this way, one can be confident that the user's actual destination is within the area searched as part of the local search. In addition, the local search might include a limit N on the number of destinations from the area that are returned. For example, specifying N=10 might limit the number of results from within the 200 meter radius to 10.

The results returned by a local search, however, can be of low quality for some types of destinations. Search results returned by a local search are usually limited to businesses, attractions, and other information available from public listings. If a user visits, for example, a friend at his or her home, the friend's home is not likely to be produced as a result in a local search. In such a case, a reverse geocoding process can be used to supply a street address as opposed to a latitude/longitude position. While a street address may be more relevant than a latitude/longitude position, neither location format may be particularly relevant and/or desirable to a user. A different type of location label, e.g., "Bob's home," may be more desirable and/or contextually relevant for a user when reviewing, accessing, analyzing, or otherwise interfacing with his or her locations visited.

The systems and techniques described herein provide for associating a relevant location label to a location visited based on contact information associated with the user. In some examples shown in FIG. 4, a technique 400 for associating a location label with a location visited is provided. To begin, collected location data is analyzed to determine one or more locations visited as described above and shown in FIG. 2. Following determination of a location visited, technique step 410 can include a search of a user's contact list to determine if the location visited matches location information stored in the contact list.

FIG. 5 illustrates an example of data that can be contained within a user's contact list. The contact list can include one or more entries where each entry corresponds to an individual, group, company, organization, etc. The contact list can include any number of data fields in association with each contact list entry. FIG. 5 illustrates a few example fields in table format, including a first name 510, last name 512, email address 514, telephone number 516, and home address that includes a street address 518, city 520, state 522, and postal code 524. Each contact list entry can have additional fields associated therewith, including any number of addresses. Each address can include both contact location information, such as a number, street name, city, state, and postal code, as well as a contact location label, such as "home," "work," etc. In this manner, a user can store in their contact list any number of addresses in association with labels that provide additional context for the address.

Searching a user's contact list can be conducted in a variety of manners to determine if a location visited by a user corresponds to a location stored in the user's contact list. The techniques for determining if two locations match can be similar to those discussed above in connection with local search queries. In some examples, a location visited can be expressed in the form of an address and an accuracy radius. In such an example, a user's contact list can be searched by determining if an identical address exists within the contact list (e.g., an identical address number, street, city, state, and postal code). If partial matches are found (e.g., a different number on the same street in the same city, etc.), a distance calculation can be made between the address of the location visited and the partial match address to determine if the partial match lies within the accuracy radius. If so, the partial match can be utilized as a matching address. If more than one partial match is positioned within the accuracy radius, the user can be presented with both possible matches. The matches can be presented in street address form, or can be presented in the form of a contact name (e.g., "Bob") and location label (e.g., "home") associated with each matching street address in the user's contact list. The user can then be prompted to select the correct address or contact associated with the location visited.

In another example, matching can be accomplished based on geographic position rather than postal addresses. In such an example, a geographic position (e.g., a latitude, longitude, and accuracy radius) can be compared to geocoded positions of addresses stored in a user's contact list (e.g., a latitude and longitude for each address entry shown in FIG. 5). A distance calculation can be made to determine if a position of an address in the user's contact list lies within the accuracy radius of the position of the location visited. If so, the associated address or contact name and location label of the matching position can be utilized as a matching address. If more than one entry from the contact list lies within the accuracy radius of the location visited, the user can be prompted to select the correct contact for the location visited, as discussed above.

Figure 4:
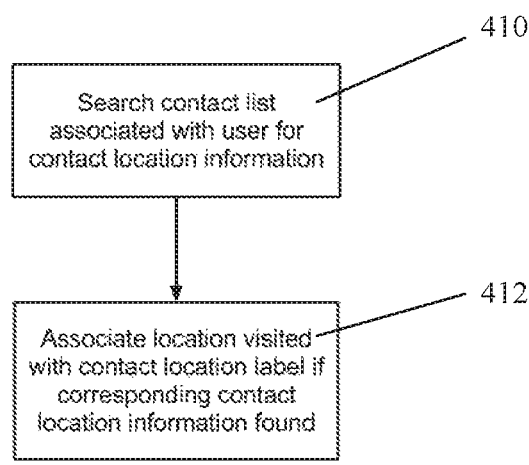
FIG. 4 is a flowchart of an example technique for searching a contact list associated with a user to match a location visited by the user with an entry in the contact list.

If a matching address or position is found, technique 400 can include associating the location visited with matching contact information from the user's contact list, as shown by step 412 in FIG. 4. Associating the location visited with matching contact information can include, for example, associating the contact name (e.g., "Bob") and location label (e.g., "home") for the matching address with the location visited. In such an example, when a user reviews or otherwise interacts with their location history data through any number of applications and/or interfaces, the location visited can be presented as, e.g., "Bob's home" rather than as a latitude/longitude position or a reverse geocoded street address. Such a presentation can be advantageous because the contact-based label for the location visited (e.g., "Bob's home") can be more contextually relevant to the user than a geographic position or street address.

Alternatively, or in addition to, the contact list searching described above, technique 400 can include searching one or more other information sources associated with the user. For example, technique 400 can include searching by a processor one or more emails associated with a user (e.g., emails stored in a user's inbox or mail system). The one or more emails may contain location information in association with contact information that is not present in the user's contact list. An example is an email footer in which a sender oftentimes includes contact information—including address or other location information—at the end of an email. The information included in a typical email footer, especially when combined with the known name and email address of the sender, can be equivalent to a comprehensive contact list entry for the sender. Accordingly, techniques and systems according to the disclosure can include searching one or more emails to determine if the location visited corresponds to location information contained in the one or more emails. If matching information is found, the location visited can be labeled using the email sender's name and, if present, a location label assigned by the sender (e.g., "office," "home,"

etc.). Furthermore, in some examples technique 400 can include creating or updating a user's contact list to include an entry for the sender along with the address or position of the location visited.

Figure 6:
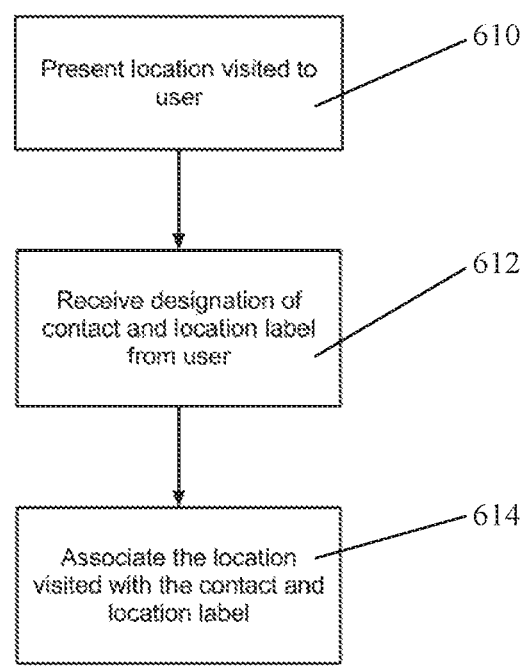
FIG. 6 is a flowchart of an example technique for associating a location visited by a user with a contact list entry.

In another example, techniques for rapidly associating an address or position of a location visited with a contact list entry are provided. An example technique 600 for doing so is illustrated in FIG. 6. To begin, collected location data can be analyzed to determine one or more locations visited as shown in FIG. 2. Following determination of a location visited, the technique 600 can include the step 610 of presenting a location visited to a user. The location visited can be presented, for example, as a latitude/longitude position, a reverse geocoded address, or both. In addition, in some examples the user can be presented with the location visited as a latitude/longitude position or reverse geocoded address only after the technique shown in FIG. 4 is unsuccessfully utilized to determine if a more contextually relevant location label is available (i.e., it is determined that the location visited is not already stored in the user's contact list in association with any contact). The location visited can be presented using a variety of different devices and user interfaces, including, for example, a location history review interface presented on a user's computer or mobile device.

The technique can further include receiving a designation of a contact and location label from the user, as shown in step 612. In an example, a user can be provided with a listing of contacts from their contact list and can select the appropriate contact associated with the location visited. The user can also be prompted to select or enter an associated location label (e.g., "home," "work," etc.). After receiving such a designation from the user, the technique can include the step 614 of associating the location visited with the contact and location label designated by the user. Associating the location visited with the contact can include, for example, updating a contact list entry for the contact to include the position and/or reverse geocoded address of the location visited along with the designated location label (i.e., the user's contact list can be updated to include the location visited under the designated label). After doing so, the contact name and location label can be utilized in future interactions with the user concerning the location visited.

Figure 7:
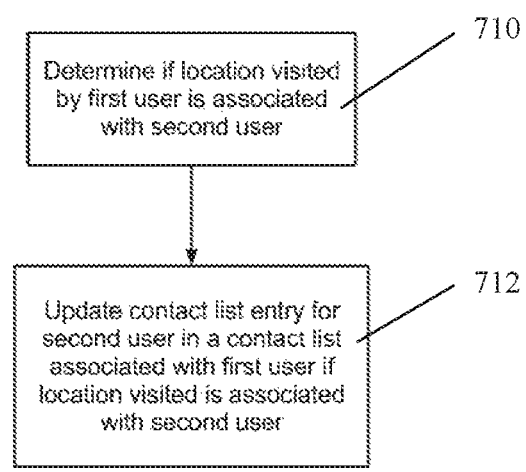
FIG. 7 is a flowchart of an example technique for updating a contact list associated with a first user with information corresponding to a location visited.

In still another example shown in FIG. 7, a technique 700 for associating a contact label with a location visited by a first user is provided that can utilize information known to a system from interactions with other users. As mentioned above, location data can be initially collected from the first user (e.g., using a mobile device associated with the user) and analyzed to determine one or more locations visited, as shown in FIG. 2. Following determination of a location visited, the technique 700 can include the step 710 of determining if the location visited by the first user is associated with a second user. A location visited may be associated with a second user if, for example, the second user has provided a label for the position and/or address of the location visited (e.g., the second user has labeled the position and/or address of the location visited as "home"). If the location visited is associated with the second user, the technique can further include updating a contact list entry for the second user in a contact list associated with the first user to include the position of the location visited and the second user's location label, as shown in step 712.

By way of example, a location server 150 may determine that a first user visits a location and that the position and/or address of the location visited does not match any positions or addresses stored in the first user's contact list (e.g., using the technique shown in FIG. 4). In such a case, the location server 150 can determine if the location visited is associated with a second user. This can be done, for example, by searching for matching positions and/or addresses processed by the location server 150 for one or more other users, though any access and searching conducted across multiple users' data must be done in accordance with accepted terms of use and privacy policies. If a matching position is discovered (e.g., a second user "Sally" has labeled the location visited as "home"), the contact list entry for the second user in the contact list of the first user can be updated to include the position and/or address of the location visited, along with the associated location label (e.g., "Sally's home"). Alternatively, if no contact list entry exists for the second user, updating the contact list of the first user can include creating a new entry for the second user.

The contact list of the first user can, in some examples, be updated automatically to include information known from interactions with other users. In other examples, however, the technique can include prompting a user for permission to update, create, or otherwise edit the contact list entry for the second user. In still other examples, the contact name and location label from the second user can be utilized when presenting location history information to the first user, and a contact list entry for the second user can be created or updated only upon election by the first user. In such an example, for example, the first user can be presented with an interface showing their location history, and the interface can present a location visited using a name and location label derived from a second user. The interface can alert the first user to the fact that the information was derived from the second user, and the first user can be prompted to add the position and/or address, location label, and contact name to their contact list (again, by updating an existing entry or creating a new one if none exists).

Examples described herein provide systems and techniques for determining locations visited by a user and associating relevant labels with the locations based on contact information. In general, the systems and techniques described herein can determine one or more locations visited by a user based on location history data collected for the user (e.g., by collecting position information from a mobile device associated with the user). The systems and techniques can further determine if a location visited by a user corresponds to an entry in a contact list of the user (e.g., an address associated with a contact in the contact list) or if a contact is known by some other means (e.g., provided by a user or otherwise known to the system from interactions with another user). In a case where a contact is known, a relevant label (e.g., "John's home") can be applied to the location visited. In addition, the contact list of the user can be updated to include the location visited in association with the contact if the location was not previously stored in the contact list.

More specifically, in a first aspect, a technique for labeling a location visited by a user using a computer processor is provided that includes collecting location history data for the user and storing the location history data in a datastore. The technique further includes determining, by a processor in communication with the datastore, a location visited from the location history data. The technique also includes searching by the processor a contact list associated with the user for contact location information corresponding to the location visited, and associating by the processor the location visited with a contact location label corresponding to matching contact location information.

The systems and techniques described herein can have a number of variations and additional features. For example, in some examples, searching a contact list associated with a user can include detecting a closest match between a location visited and one or more addresses stored in the contact list.

In other examples, collecting location history data for the user can include receiving location history data from a mobile device associated with the user. The location history data can, in some examples, include information representing one or more dates, times, and geographic positions.

In still other examples, determining one or more locations visited by the user can include clustering a plurality of geographic positions from the location history data. Clustering can, in some examples, return a central geographic position and an accuracy radius denoting the center of the plurality of geographic positions from the location history data.

One or more geographic positions included in, or derived from, the location history data can be in the form of a position of latitude and longitude. In some examples, determining a location visited by the user can include reverse geocoding one or more geographic positions derived from the location history data.

In certain examples, the technique can include searching other information sources associated with the user in addition to a contact list associated with the user. For example, in some examples the technique can include searching by the processor one or more emails associated with the user to detect contact location information corresponding to the location visited. This can be useful if, for example, the user does not have a contact's address stored in their contact list, but has an email from the contact containing the address (e.g., in a footer of an email from the contact). In such an example, a location label associated with the contact can be applied to the location visited and the user's contact list can be updated to include the location information in an entry for the contact.

In another aspect, a technique for associating location information with a contact using a computer processor is provided that includes collecting location history data for a user and storing the location history data in a datastore. The technique further includes determining, by a processor in communication with the datastore, a location visited from the location history data. The technique also includes receiving a designation of a contact and a location label from the user, and associating by the processor the location visited with the contact and location label. In some examples, associating the location visited with the contact and the location label can include updating a contact entry for the contact to include the location visited and the location label.

In still another aspect, a technique for associating location information with a contact using a computer processor is provided that includes collecting location history data for a first user and storing the location history data in a datastore, as well as determining, by a processor in communication with the datastore, a location visited by the first user from the location history data. The technique also includes determining by the processor if the location visited by the first user is associated with a second user. The technique further includes updating by the processor a contact list entry for the second user in a contact list associated with the first user to include the location visited in a case where the location visited is associated with the second user.

In some examples, updating a contact list entry can include associating with the location visited a location label derived from the second user. In so doing, a location can be labeled and associated with a contact name so long as it is known to a system, despite the fact that the contact list for the first user may not have included the location visited or, in some cases, even an entry for the second user. In certain examples, updating the contact list entry can include prompting the first user for permission to edit the contact list entry for the second user (or create a contact list entry for the second user if none existed) prior to doing so.

In some examples, the disclosure describes techniques that can be implemented by one or more devices described with reference to FIG. 1, e.g., mobile device 120 and/or location server 150. As described above, in some examples, functionality of location server 150 can be implemented by mobile device 120. Mobile device 120 and location server 150 can be generically referred to as a computing device.

In one example, a technique includes collecting, by a computing device (e.g., mobile device 120, location server 150, and/or one or more processors included in mobile device 120 and/or location server 150), location history data associated with a user. The technique can also include determining, by the computing device and based on the location history data, a location visited by the user. Additionally, the technique can include associating, by the computing device, the location visited by the user with a contact location label, the contact location label determined based at least in part on contact information associated with the user and the location, and outputting, by the computing device, the contact location label.

In some examples, the contact information includes a name of a contact of the user, and outputting, by the computing device (e.g., mobile device 120, location server 150, and/or one or more processors included in mobile device 120 and/or location server 150), the contact location label includes outputting, by the computing device, the contact location label and the name of the contact of the user.

In some examples, collecting location history data for the user includes receiving, from a mobile computing device associated with the user (e.g., mobile device 120), the location history data.

In some examples, the location history data includes a plurality of geographic positions, a respective time associated with a respective geographic position from the plurality of geographic positions, and a respective date associated with the respective geographic position from the plurality of geographic positions.

In some examples, determining the location visited by the user includes calculating, by the computing device (e.g., mobile device 120, location server 150, and/or one or more processors included in mobile device 120 and/or location server 150), a geographic center for a cluster of location history data points from the location history data. In some examples, the technique can further include calculating, by the computing device, an accuracy radius for the geographic center.

In some examples, determining the location visited by the user includes converting geographic coordinates derived from the location history data into an address.

In another example, the disclosure describes a system including one or more processors. The one or more processors can be included in, for example, mobile device 120 and/or location server 150. The one or more processors can be configured to collect location history data associated with a user and calculate a geographic center for a cluster of location history data points from the location history data and an accuracy radius for the geographic center, the geographic center and the accuracy radius together defining a location visited by the user. Additionally, the one or more processors can be configured to associate the location visited by the user with a contact location label, the contact location label determined based at least in part on contact information associated with the user and the location, and output the contact location label.

In some examples, the contact information includes a name of a contact of the user, and wherein the one or more processors are configured to output the contact location label and the name of the contact of the user.

In some examples, the one or more processors are configured to receive, from a mobile computing device associated with the user (e.g., mobile device 120), the location history data.

In some examples, the location history data includes a plurality of geographic positions, a respective time associated with a respective geographic position from the plurality of geographic positions, and a respective date associated with the respective geographic position from the plurality of geographic positions.

In some examples, the one or more processors are further configured to convert geographic center into an address.

In some examples, the contact information associated with the user includes at least one address, and the one or more processors are configured to associate the location visited by the user with a contact location label by detecting an at least partial match between the at least one address and the location visited by the user.

In another example, the disclosure describes a technique that includes collecting, by a computing device (e.g., mobile device 120, location server 150, and/or one or more processors included in mobile device 120 and/or location server 150), location history data associated with a user. The technique also can include determining, by the computing device, based at least in part on the location history data, a location visited by the user, and determining, by the computing device, that the location visited by the user is associated with a location label. The technique can further include updating, by the computing device, a contact list associated with the user to include a contact list entry including the location label and an indication of the location.

In some examples, the location history data includes a plurality of geographic positions, a respective time associated with a respective geographic position from the plurality of geographic positions, and a respective date associated with the respective geographic position from the plurality of geographic positions.

In some examples, determining the location visited by the user includes calculating, by the computing device (e.g., mobile device 120, location server 150, and/or one or more processors included in mobile device 120 and/or location server 150), a geographic center for a cluster of location history data points from the location history data. In some examples, the technique further includes calculating, by the computing device (e.g., mobile device 120, location server 150, and/or one or more processors included in mobile device 120 and/or location server 150), an accuracy radius for the geographic center.

In some examples, determining the location visited by the user includes converting geographic coordinates derived from the location history data into an address.

In some examples, the location label is derived from a second user.

In some examples, updating the contact list associated with the user includes prompting the user for permission to edit the contact list entry for the second user.

In some examples, the location includes a business.

In another example, the disclosure describes a system includes one or more processors. The one or more processors can be included in, for example, mobile device 120 and/or location server 150. The one or more processors can be configured to collect location history data associated with a user; determine, based at least in part on the location history data, a location visited by the user; determine that the location visited by the user is associated with a location label derived from a second user; and update a contact list associated with the user to include a contact list entry associated with the second user including the location label and an indication of the location.

In some examples, the location history data includes a plurality of geographic positions, a respective time associated with a respective geographic position from the plurality of geographic positions, and a respective date associated with the respective geographic position from the plurality of geographic positions.

In some examples, the one or more processors are configured to determine the location visited by the user by calculating a geographic center for a cluster of location history data points from the location history data and an accuracy radius for the geographic center.

In some examples, the one or more processors are configured to determine the location visited by the user by converting geographic coordinates derived from the location history data into an address.

In some examples, the one or more processors are further configured to prompt the user for permission to edit the contact list to add a contact list entry for the second user.

In some examples, the location includes a business.

Although a few example implementations have been described in detail above, other modifications are possible. Moreover, other mechanisms for performing the systems and techniques described herein may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the claims.

The terms "a" and "an" are used interchangeably above, and are equivalent to the phrase "one or more" as utilized in the present application. The terms "comprising," "having," "including," and "containing" are to be construed as open-ended terms (i.e., meaning "including, but not limited to,") unless otherwise noted above. The recitation of any ranges of values herein is merely intended to serve as a shorthand technique of referring individually to each separate value falling within the range, unless otherwise indicated herein, and each separate value is incorporated into the specification as if it were individually recited. The use of any and all examples, or example language (e.g., "such as"), provided herein is intended merely to better illuminate the disclosure and does not impose a limitation on the scope of the disclosure unless otherwise claimed. No language in the specification should be construed as indicating any non-claimed element as essential to the practice of the techniques of this disclosure. Finally, any papers and publications cited herein are hereby incorporated by reference in their entirety.

What is claimed is:

1. A method for labeling geographic locations, the method comprising:
   presenting, via a user interface, an indication of a geographic location to a user;
   determining, by one or more processors, that the geographic location corresponds to an address included in contact information for one of a plurality of contacts of the user, including identifying a most proximate address from among respective addresses of the plurality of contacts of the user, the contact information further including a name;

receiving, via the user interface, an indication that the geographic location is to be associated with the name included in the contact information;

generating, by the one or more processors, a location label for the geographic location, using the name included in the contact information; and outputting, by the one or more processors, an indication of the location label.

2. The method of claim 1, wherein determining that the geographic location corresponds to the address included in the contact information includes:

determining partial matches between the geographic location and respective addresses of several of the plurality of contacts of the user; and prompting the user to select the contact information from the several of the plurality of contacts of the user.

3. The method of claim 2, wherein determining the partial matches includes determining whether an address is within a certain accuracy radius of the geographic location.

4. The method of claim 2, wherein prompting the user to select the contact information includes prompting the user for "home" or "work" designation.

5. The method of claim 1, wherein presenting the indication of the geographic location to the user includes providing a latitude/longitude position.

6. The method of claim 1, wherein outputting the indication of the location label includes presenting the name included in the contact information via an interface for viewing location history data for the user.

7. The method of claim 1, wherein determining that the geographic location corresponds to the address included in the contact information includes processing an email message from the contact.

8. The method of claim 1, further comprising:

executing a search query for the geographic location;

wherein determining that the geographic location corresponds to the address included in the contact information is response to determining that the search query yields no results for the geographic location.

9. The method of claim 1, wherein the location label is generated using the name included in the contact information in a first instance, the method further comprising:

in a second instance, determining that a second geographic location does not correspond to any addresses for one of the plurality of contacts of the user;

determining, by the one or more processors, that a second user assigned a label to the geographic location; and generating, by the one or more processors, a location label for the geographic location based on the label the second user assigned.

10. A non-transitory computer-readable memory encoded with instructions that, when executed by one or more or more processors of a computing device, cause the one or more processors to:

present, via a user interface, an indication of a geographic location to a user;

determine that the geographic location corresponds to an address included in contact information for one of a plurality of contacts of the user, including identify a most proximate address from among respective addresses of the plurality of contacts of the user the contact information further including a name;

receive, via the user interface, an indication that the geographic location is to be associated with the name included in the contact information;

generate a location label for the geographic location, using the name included in the contact information; and output an indication of the location label.

11. The non-transitory computer-readable memory of claim 10, wherein to determine that the geographic location corresponds to the address included in the contact information, the instructions cause the one or more processors to:

determine partial matches between the geographic location and respective addresses of several of the plurality of contacts of the user; and prompt the user to select the contact information from the several of the plurality of contacts of the user.

12. The non-transitory computer-readable memory of claim 11, wherein to determine the partial matches, the instructions cause the one or more processors to determine whether an address is within a certain accuracy radius of the geographic location.

13. The non-transitory computer-readable memory of claim 11, wherein to prompt the user to select the contact information, the instructions cause the one or more processors to prompt the user for "home" or "work" designation.

14. The non-transitory computer-readable memory of claim 10, wherein to present the indication of the geographic location to the user, the instructions cause the one or more processors to provide a latitude/longitude position.

15. The non-transitory computer-readable memory of claim 10, wherein to output the indication of the location label, the instructions cause the one or more processors to present the name included in the contact information via an interface for viewing location history data for the user.

16. The non-transitory computer-readable memory of claim 10, wherein to determine that the geographic location corresponds to the address included in the contact information, the instructions cause the one or more processors to process an email message from the contact.

17. The non-transitory computer-readable memory of claim 10, wherein the instructions further cause the one or more processors to:

execute a search query for the geographic location;

wherein to determine that the geographic location corresponds to the address included in the contact information is response to determining that the search query yields no results for the geographic location.

18. The non-transitory computer-readable memory of claim 10, wherein the location label is generated using the name included in the contact information in a first instance, wherein the instructions further cause the one or more processors to:

in a second instance, determine that a second geographic location does not correspond to any addresses for one of the plurality of contacts of the user;

determine that a second user assigned a label to the geographic location; and generate a location label for the geographic location based on the label the second user assigned.

* * * * *